United States Patent [19]

Tateyama et al.

[11] 4,412,261
[45] Oct. 25, 1983

[54] MAGNETIC DISK MEMORY DEVICE

[75] Inventors: Kenichi Tateyama, Odawara; Yasuo Matsumiya, Nakaimachi; Toshio Hishinuma, Kanagawa, all of Japan

[73] Assignee: Hitachi, Ltd., Tokyo, Japan

[21] Appl. No.: 252,816

[22] Filed: Apr. 10, 1981

[30] Foreign Application Priority Data

Apr. 16, 1980 [JP] Japan .................. 55-49234

[51] Int. Cl.³ .................. G11B 5/60; G11B 5/40
[52] U.S. Cl. .................. 360/98
[58] Field of Search .................. 360/97–99, 360/133, 135, 86; 206/444

[56] References Cited

U.S. PATENT DOCUMENTS

| | | | |
|---|---|---|---|
| 3,723,980 | 3/1973 | Gabor | 360/98 |
| 3,812,534 | 5/1974 | Rousseau et al. | 360/98 |
| 3,973,273 | 8/1976 | Lissner et al. | 360/98 |
| 4,216,512 | 8/1980 | Vidwans | 360/97 |
| 4,339,777 | 7/1982 | Gruczelak | 360/97 |

FOREIGN PATENT DOCUMENTS 2657368 6/1977 Fed. Rep. of Germany ........ 360/98

Primary Examiner—Alfred H. Eddleman
Attorney, Agent, or Firm—Antonelli, Terry & Wands

[57] ABSTRACT

A magnetic disk memory device of the invention has a shroud accommodating replaceable or changeable disk packs and air passages through which air is circulated to cool the disk packs and the access mechanism. This air passage is formed, when a shroud cover for closing the space in the shroud is in the closing position, to recirculate the air through the space in the shroud, while, when the shroud cover is in the opening position, to discharge the air delivered by a blower to the outside of the shroud through the opening of the latter. The air passage has an air filter for filtrating the air.

9 Claims, 4 Drawing Figures

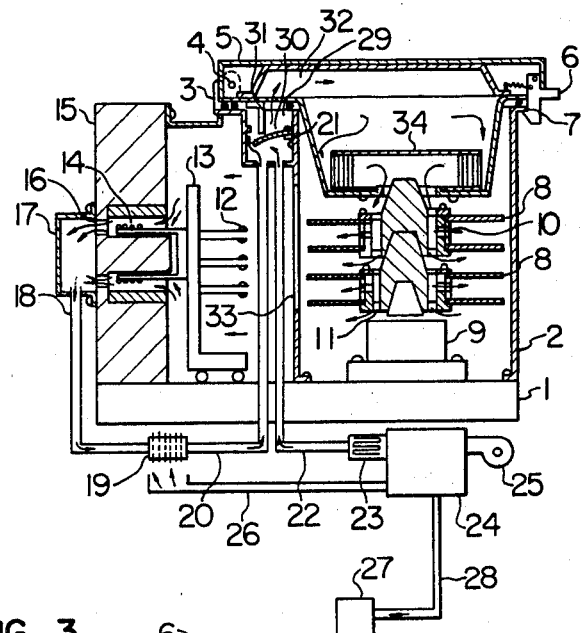
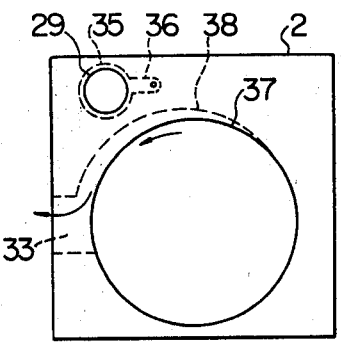
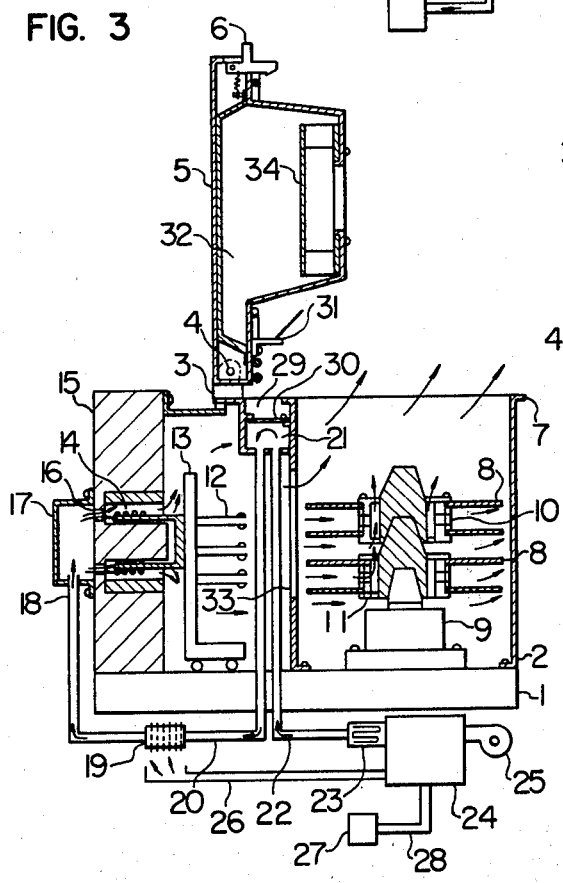
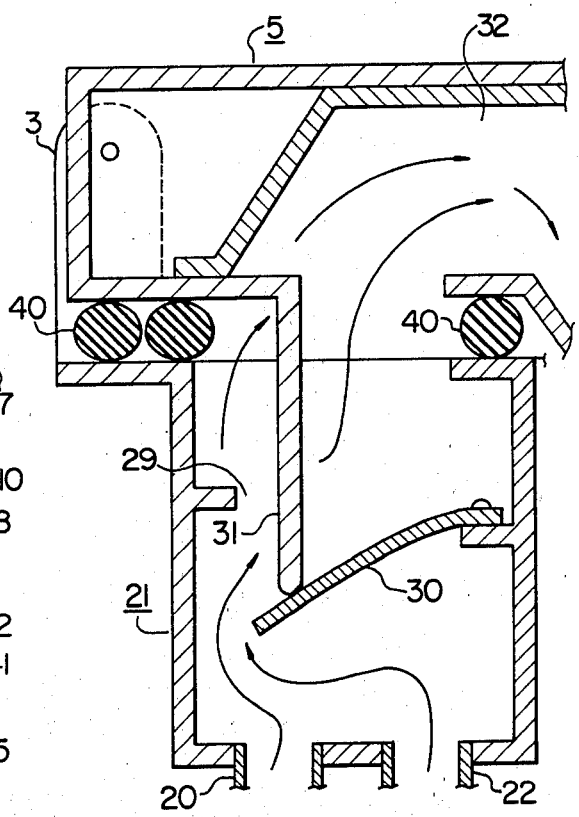

MAGNETIC DISK MEMORY DEVICE

BACKGROUND OF THE INVENTION

1. Field of the Invention

The present invention relates to a magnetic disk memory device and, more particularly, to a magnetic disk memory device having the functions of removing dust from the internal air thereof and cooling the same.

2. Description of the Prior Art

In a magnetic disk memory device in which a magnetic disk is used as the recording medium, magnetic recording and reproduction is effected by a magnetic head which is floated by the balance of aerodynamical forces to form a slight gap of an order of serveral $\mu$m between itself and the surface of the magnetic disk. This system is considered to be more reliable than the conventional system in which the magnetic head is held always in contact with the magnetic disk, because the wear of the magnetic head and magnetic disk is suppressed. For this reason, the "floating system" in which the magnetic head floats above the surface of the magnetic disk has become popular.

In adopting this floating system, it is required to diminish as much as possible the dust suspended by the air in the space between the magnetic head and the magnetic disk, in order to preserve a highly stable floating gap between the magnetic disk and the magnetic head. The elimination of the dust is essential to avoid a phenomenon called "head crush" in which the magnetic disk and/or the magnetic head is damaged by dust particles of several $\mu$m coming into the gap between the magnetic head and the magnetic disk which moves at a speed of several tens of meters per minute.

Generally, the magnetic disk memory device is equipped with an air filter for filtrating the internal air to remove the dust. More specifically, an air filter capable of removing dust particles of particle sizes exceeding 0.3 $\mu$m at a high rate of 99.97 to 99.99% is disposed at a suitable portion of the air passage to filtrate the air before the latter is supplied to the region around the magnetic disk and magnetic head of the memory device.

Hitherto, the following air filtration systems (a) to (c) have been proposed.

(a) An external air take-in system in which external fresh air is continuously taken into the device. The air is filtrated by a filter and, after flowing in the conduit, is discharged to the outside. This external air supply system is disclosed in U.S. Pat. No. 3,710,540.

(b) An internal air circulation system in which a closed loop for circulation of air is formed in the magnetic disk memory device to include an air filter. Air is circulated by the flow induced as a result of rotation of the magnetic disk. This system is shown in U.S. Pat. No. 3,710,540.

(c) An external air supplementary system in which, in order to prevent the induction of external air due to a vacuum established in the space defined by a shroud which houses the magnetic disk, a blower is disposed at a suitable portion in the air passage to pressurize the air from the outside. An example of this system is shown in U.S. Pat. No. 4,008,492. These air filtration systems, however, suffer the following disadvantages (A), (B) and (C).

(A) External Air Supply System

Since the coarse dust particles of the fresh air equivalent to the ambient air are continuously removed by the air filter, the life of the air filter is impractically shortened depending on the condition of use. The clogging of air filter by the dust particles caught by the filter causes a reduction of pressure in the magnetic disk pack chamber. To avoid this, a frequent renewal of the filter becomes necessary. To eliminate this problem, it is proposed to provide air filters in a plurality of stages. In such a case, however, the construction of the air filtration system becomes impractically complicated.

(B) Internal Air Circulation System

This system is effective as the countermeasure for protecting the magnetic disc memory device against dust, when the space in the shroud is isolated perfectly, as in the case of a magnetic disk memory device which requires no replacement of the magnetic disk. However, when this air filtration system is applied to a large-size magnetic disk memory device having a multiplicity of disks adapted to be rotated by a common spindle, the temperature inside the shroud is inconveniently increased due to a wind loss to adversely affect the mechanical parts to deteriorate the precision of locating of the magnetic head which makes an access on the magnetic disk.

Furthermore, in the magnetic disk memory device having a changeable disk pack, coarse dust particles come into the device from the outside at each time of the changing of the disk pack, resulting in a rapid clogging of the air filter and hence a rapid pressure reduction in the magnetic disk pack chamber which in turn requires a frequent renewal of the air filter.

(C) External Air Supplementary System

This system is effective in preventing dust from coming into the conduit or passage including the magnetic disk pack chamber due to the temperature difference between the passage and the outside of the passage, when the magnetic disk memory device is not operating. However, as in the case of the internal air circulation system (b), the temperature of the air in the shroud is inconveniently raised due to wind loss to deteriorate the precision of locating the magnetic head when this system is applied to a large-size magnetic disk memory device having a multiplicity of magnetic disks adapted to be rotated by a common spindle.

SUMMARY OF THE INVENTION

It is, therefore, a first object of the invention to provide a magnetic disk memory device in which the production of heat due to wind loss and production of heat from various mechanical parts are effectively suppressed.

It is another object of the invention to obtain a longer life for the air filter by preventing the dust from coming into the device at the time of changing of the magnetic disk pack.

It is still another object of the invention to provide a magnetic disk memory device in which the undesirable accumulation of dust due to complicated shape of the magnetic head carriage and its periphery is avoided.

It is a further object of the invention to provide a magnetic disk memory device in which a heat exchanger is cooled by a flow of air produced by a blower which is adapted to induce the air from the outside.

It is a still further object of the invention to provide a magnetic disk memory device of the type having a single spindle adapted to carry two or more disk packs, in which, in replacing or changing one of the disk packs, the disk pack which has been loosened and remaining on the spindle is cooled by the ambient air to a temperature of the new disk pack which has been subjected to the ambient air, to obtain a highly precise follow-up characteristic of the servo control for controlling the magnetic disk following up the data track.

To these ends, according to the invention, there is provided a shroud containing a disk pack and an access mechanism; a shroud cover for covering and closing the shroud; a blower adapted to induce external air and to supply the same, after filtration by a filter; an air passage control means for receiving the filtered air from the blower; a first air passage forming a passage of air between the area in the vicinity of an access mechanism in the shroud and the air passage control means; a second air passage forming a passage of air between the area in the vicinity of a disk pack in the shroud and the air passage control means; and the air passage control means adapted to direct, when the shroud cover is opened, the air coming from the blower only to the first air passage to permit the air to be discharged to the outside after cooling of the access mechanism and the disk pack, the air passage control means being adapted also to direct, when the shroud cover is closed, the air coming from the blower to the second air passage to permit the air to be returned, after cooling of the disk pack and the access mechanism, back to the air passage control means.

The shroud cover is provided with a filter for filtrating the air supplied through the second air passage. A heat radiator for radiating heat flowing through the first air passage is disposed in the latter.

BRIEF DESCRIPTION OF THE DRAWINGS

FIG. 1 is a sectional side elevational view of a magnetic disc memory device constructed in accordance with a first embodiment of the invention;

FIG. 2 is an illustration of the shape of a shroud incorporated in the magnetic disc memory device of the invention;

FIG. 3 is a sectional side elevational view of a magnetic disc memory device of the invention shown in FIG. 1 with the shroud cover thereof being opened; and FIG. 4 is an enlarged view of a box 21 incorporated in the magnetic disk memory device of the invention.

DESCRIPTION OF THE PREFERRED EMBODIMENTS

The magnetic disc memory device of the invention has a plurality of replaceable or changeable disk packs. An air circulation system of the aforementioned external air supplementary type is formed when the disk packs are mounted, while, during the changing of the disk pack, an air circulation system of the aforementioned external air supply system is formed. The switching of the air circulation system is performed by a first box (box 21) which forms an air passage control means, as will be described in detail later.

Referring first to FIG. 1, a hinge 3 is incorporated in the upper part of the shroud 2 screwed to a base 1. The hinge 3 includes a shaft 4 around which a shroud cover 5 is swung into and out of the position for closing the upper opening of the shroud 2.

A latch handle 6 is secured to a cover 5. The latch handle 6 is adapted to engage with a projection 7 of the shroud 2 to make the shroud cover 5 close the upper opening of the shroud 2.

A spindle 9 mounted on a base 1 is adapted to replaceably carry two magnetic disk packs 8. The spindle 9 in the state carrying two magnetic disk packs is adapted to be driven in one direction by a driving motor.

Each disk pack 8 is provided with a provided with a multiplicity of magnetic discs including a disk surface in which a servo track is recorded and an upper and a lower guard disc surfaces. The magnetic disks are carried by a hub which is provided with air discharge ports 10, 11 through which air induced into the central portion of the spindle is discharged radially outwardly from the magnetic disk.

The base 1 has a supporting carriage 13 carrying a plurality of magnetic heads 12 corresponding to the magnetic disk surfaces and a voice coil motor 15 for driving the carriage 13. The carriage 13 is adapted to be moved linearly in the radial direction of the magnetic disk to locate the magnetic head 12 on the desired track in the magnetic disc, as a voltage is imposed on the voice coil 14 of the voice coil motor 15.

An aperture 16 is formed behind the voice coil motor 15. A duct 18 constituting an air passage is connected to a shield box 17 enclosing the aperture 16. The duct 18 is connected through a heat exchanger 19 to a duct 20 which in turn is connected to a box 21, which forms an air passage control means for receiving filtered air from the blower. The air passage system constituted by a shield box 17, duct 18, heat exhanger 19 and the duct 20 will be referred to as "first air passage", hereinafter.

The duct 20 of the first air passage is connected to the box 21 which is disposed at one side of upper portion of the shroud 2. The box 21, which will be referred to as "first box", hereinafter, is shown at a larger scale in FIG. 4. As will be seen from FIG. 4, the first box 21 is provided therein with a leaf spring 30 which is adapted to close the opening 29. The arrangement is such that, as the cover 5 is moved to the closing position, a pressing plate 31 of the cover depresses the leaf spring 30 to open the opening 29 through which the ducts 20, 22 are made to communicate with an air chamber 32 in the cover 5.

A reference numeral 40 denotes a packing made of rubber or the like which seals box 21, when the cover 5 is kept closed.

Therefore, in the state that the magnetic disk pack is rotatively driven after the closing of the cover 5, an air circulation system is formed to include the space in the shroud 2, gap of the voice coil motor 15, first air passage, box 21 and the air chamber 32 of the cover 5, as will be seen from FIG. 1. In addition to this air circulation system, the device of the invention has a second air passage which is adapted to introduce the flow of air generated by the blower 25 to the first box 21 through a box 24, filter 23 and the duct 22.

The above-mentioned box 24 (referred to as second box, hereinafter) has an air distributing fuction of distributing the flow of air from the blower 25 to an electronic section 27 through a duct 26 and to a heat exchanger 19 through a duct 26.

Thus, in the magnetic disk memory device of the invention, an air circulation system of an external air supplementary type is formed as the cover is closed, so that the dust suspended by the air is removed and the internal air is effectively cooled as it flows through the heat radiator 19.

The air circulating system during the changing of the magnetic disk pack will be described hereinunder with specific reference to FIG. 3 in which the same reference numerals are used to denote the same parts or members as those in FIG. 1.

More specifically, FIG. 3 shows the magnetic disk memory device with its shroud cover held in the opening position.

After the cover 5 is opened by operating a latch handle 6 after a stopping of the driving motor and, hence, the stopping of the rotation of the magnetic disk pack 8, as shown in FIG. 3. In this state, the pressing plate 31 of the cover 5 releases the leaf spring 30 to permit the latter to close the opening 29. In consequence, the air flowing in the second air passage, i.e. the air delivered by the blower 25 to the duct 22 flows through the first passage in the reverse direction through the gap in the voice coil motor 15 and the area around the carriage 13, and is discharged to the outside of the shroud 2.

As a result of the external discharge of air, the disk pack 8 and other constituents in the shroud 2 are effectively cooled and, in addition, the dusts are prevented from coming into the memory device.

Hereinafter, the construction of the shroud 2 including the box 21 for switching the air circulation passage in accordance with the opening and closing of the cover 5 will be described with specific reference to FIG. 2 which is a top plan view of the shroud 2.

As will be seen from this Figure, the leaf spring 30 for closing the opening 29 on the box 21 has a circular portion 35 and an elongated strip portion 36 of a small width. The opening 29 is opened and closed by the circular portion 35. The shroud 2 has a circular upper portion 37 for housing the magnetic disk pack to facilitate the mounting and demounting of the magnetic disk pack. Within the shroud 2, disposed is a spiral wall 38 the radius of which gradually increases in the direction of rotation of the magnetic disk pack. This spiral wall 38 is adapted to guide the flow of air discharged from a head inlet/outlet opening 33 toward the carriage 13. In order to facilitate the understanding of the embodiment, disk packs and other associated parts are omitted from this Figure.

As will be seen from the foregoing description, according to the invention, it is possible to cool the air heated as a result of rotation of the disk packs, by the heat radiator which is disposed in the air circulation passage of external air supplementary type formed when the shroud cover is kept closed. In consequence, the undesirable distortion of the magnetic disks and changes of characteristics of various mechanical parts which may, for otherwise, be caused by the heated air are effectively avoided to permit a highly precise locating operation of the magnetic head.

Furthermore, since fresh air is blown from the side near the linear motor to the wide opening of the shroud when the cover is opened beyond a predetermined opening degree for the changing or replacement of the disk pack, it is possible to prevent external dust from coming into the memory device. This blow of air is effective also in blowing off the contaminants or dust attaching to the magnetic disks to the outside of the memory device.

In addition, by employing a spiral internal structure of the shroud, it is possible to remarkably reduce the accumulation of dust to the area around the magnetic head insertion opening which usually has a complicated form.

What is claimed is:

1. A magnetic disc memory device having at least one disk pack including a plurality of magnetic disks and adapted to be driven rotatively, a magnetic head adapted to make recording and reproducing of information in and out of said magnetic disks, an access mechanism supporting said magnetic head and adapted to locate said magnetic head on the track in said magnetic disks, and an enclosure integrally enclosing said disk pack, magnetic head, and said access mechanism, said disk pack being removable;

said magnetic disk memory device comprising:
that said enclosure surrounds and encloses said disk pack and said access mechanism and provided with an opening through which said disk pack is changed with another disk pack;
a cover adapted to cover said opening of said enclosure and adapted to permit said opening to be opened as desired;
an air intake means for taking-in the external air through a filter;
an air passaage control means for receiving the cleaned air from said air intake means;
a first air passage connected at its one end to said air passage control means while the other end being opened to the inside of said enclosure to permit the air to be circulated between said air passage control means and the space inside said enclosure; and
a second air passage connected at its one end to said air passage control means and opened at its other end to a portion in the space within said enclosure different from the portion of the same to which said first air passage opens, thereby to permit said air to be circulated between said air passage control means and the space inside said enclosure;
said air passage control means being operated in response to opening and closing motion of said cover in such a manner as to permit said air supplied from said air intake means to be circulated through said first air passage when said cover is in the opening position, and to permit, when said cover is in the closing position, the air delivered by a blower to be circulated through said second air passage and be recycled to said second air passage through said first air passage.

2. A magnetic disk memory device as claimed in claim 1, wherein said opening is provided at an upper portion of said enclosure said second air passage opens in said cover.

3. A magnetic disk memory device as claimed in claim 2, wherein said cover has an air chamber which can be filled with air and which is connected to said second air passage, said air chamber being provided with an aperture opening toward the area near the center of rotation of said disk pack.

4. A magnetic disk memory device as claimed in claim 3, wherein said cover is provided with provided with an air filter adapted to filtrate the air which is supplied through said second air passage.

5. A magnetic disk memory device as claimed in claim 1, wherein said air passage control means is adapted to cut off the flow of air in said second air passage when said cover is in the opened position.

6. A magnetic disk memory device as claimed in any one of claims 1, 2 and 3, wherein said access mechanism includes a voice coil and a magnet surrounding said voice coil, and wherein said first air passage is so constructed as to communicate with the space inside said enclosure through the gap between said voice coil and said magnet to permit the air to flow through said gap.

7. A magnetic disk memory device as claimed in claim 2, wherein said air passage control means includes a box having a first and a second inner surfaces opposing to each other, the air from said air intake means being supplied to said box at said first inner surface, said first air passage opening at said one end in said first inner surface while said one end of said second air passage opening in said second inner surface, said air passage control means further including interrupting means adapted to selectively interrupt the communication between said first and second inner surfaces in response to the movement of said cover toward the opening position.

8. A magnetic disk memory device as claimed in claim 1, wherein said first air passage for circulating said air between said air passage control means and said space in said enclosure has a heat radiator for radiating heat.

9. A magnetic disk memory device as claimed in claim 8, characterized by further comprising a third air passage through which the air taken into the device through said air intake means flows, said third passage being adapted to blow air against said heat radiator.

* * * * *